(12) United States Patent
Sakuma et al.

(10) Patent No.: US 6,206,557 B1
(45) Date of Patent: Mar. 27, 2001

(54) TRAFFIC SIGN WITH VERTICALLY MOVABLE LIGHT SOURCE

(75) Inventors: Noritoshi Sakuma; Kyohei Marukawa, both of Chiba; Kaoru Ishida, Saitama; Takao Suzuki, Fukushima, all of (JP)

(73) Assignees: Kinugawa Rubber Ind. Co., Ltd., Chiba; Nippon Liner Co., Ltd., Tokyo, both of (JP)

(*) Notice: Subject to any disclaimer, the term of this patent is extended or adjusted under 35 U.S.C. 154(b) by 0 days.

(21) Appl. No.: 09/373,568

(22) Filed: Aug. 13, 1999

(30) Foreign Application Priority Data

Aug. 13, 1998 (JP) .................................................. 10-228853

(51) Int. Cl.$^7$ .................................................. B64D 47/06
(52) U.S. Cl. ........................ 362/559; 362/153.1; 340/578; 340/568; 40/541
(58) Field of Search ................................. 362/559, 153.1; 40/541, 561, 340; 340/44, 907, 612, 564, 574, 565, 578, 568

(56) References Cited

U.S. PATENT DOCUMENTS 2,784,388  * 3/1957 King et al. .......................... 340/907
3,502,856  * 3/1970 Daley ................................ 200/302.1
3,703,855  * 11/1972 Converso ............................. 404/11
3,895,345  * 7/1975 Elvers et al. ........................ 340/907

FOREIGN PATENT DOCUMENTS 59-122612   7/1984  (JP) .
5-346009   12/1993  (JP) .
9-158135    6/1997  (JP) .

* cited by examiner

Primary Examiner—Sandra O'Shea
Assistant Examiner—Bertrand Zeade
(74) Attorney, Agent, or Firm—Foley & Lardner (57) ABSTRACT

A traffic sign for use in a paved road has a housing with an open upper end. A holder is vertically movably received in the housing. A light emitting unit is installed in the holder to move therewith. A transparent plate is mounted on the holder to move therewith. The transparent plate permits a light from the light emitting unit to transmit therethrough. A space is defined between a bottom of the housing and a lower end of the holder to permit the vertical movement of the holder in the housing. An elastic support ring has an inner wall fixed to an outer surface of the holder and an outer wall fixed to an inner surface of the housing. Projections are formed on the elastic support ring. Each projection projects upward beyond the transparent plate. Recesses are provided by the elastic support ring. Each recess is defined between the projections, so that the light from the light emitting unit is viewed through the transparent plate and each of the recesses.

19 Claims, 9 Drawing Sheets

TRAFFIC SIGN WITH VERTICALLY MOVABLE LIGHT SOURCE

BACKGROUND OF THE INVENTION

1. Field of the Invention

The present invention relates in general to traffic signs which issue traffic signals for achieving the safety passage of motor vehicles running on roads, and more particularly to traffic signs of a type which is mounted on a paved road. More specifically, the present invention is concerned with the traffic signs of a type having a sinkable light source for protecting the light source when a snow removing vehicle or the like runs over the sign.

2. Description of the Prior Art

Hitherto, various types of traffic signs of the above-mentioned type have been proposed and put into practical use.

For clarifying the task of the present invention, exemplified two of the conventional traffic signs of such type will be briefly described in the following.

One is a traffic sign described in Japanese Patent Second Provisional Publication 59-122612, which will be described with reference to FIGS. 12 and 13 of the accompanying drawings.

Figure 12:
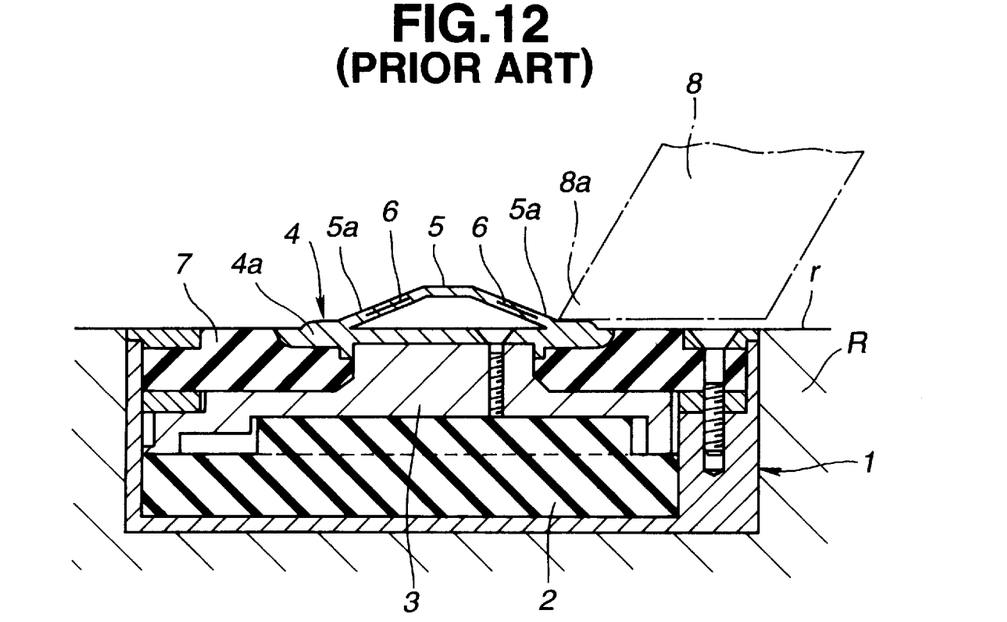
FIGS. 12 is a sectional view of a conventional traffic sign.

As is seen from FIG. 12, the traffic sign of the publication comprises a bottomed cylindrical housing 1 which is laid under a paved road surface "r". A circular elastic member 2 is put on the bottom of the housing 1 and a projected member 3 is put on the circular elastic member 2. A reflector holder 4 constructed of a transparent material is mounted on the projected member 3. The reflector holder 4 comprises a flat bottom wall 4a and a convex upper wall 5 which is integrally projected from a periphery of the flat bottom wall 4a. As shown, the convex upper wall 5 is projected upward beyond the paved road surface "r" and has a plurality of light reflecting plates 6 embedded in a slanted wall part 5a of the wall 5. An elastically deformable annular gasket 7 is arranged with its inner peripheral portion resiliently disposed between the projected member 3 and the flat bottom wall 4a of the reflector holder 4.

Figure 13:
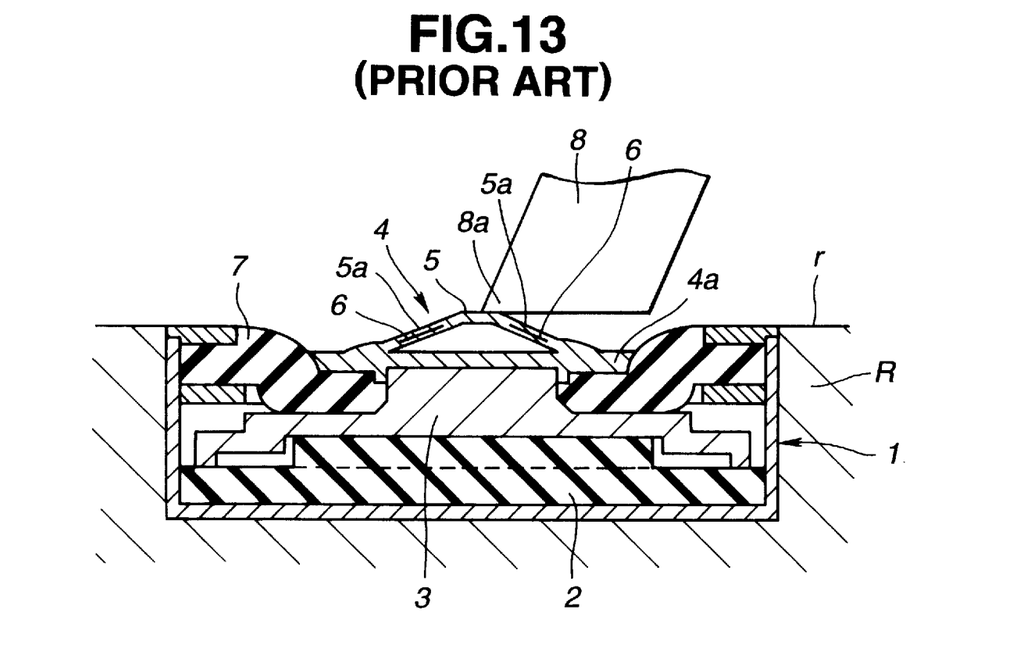
FIG. 13 is a view similar to FIG. 12, but showing a different operation condition of the conventional traffic sign.

When now as is seen from FIGS. 12 and 13, a snow removing vehicle running on the road surface "r" comes to a position to have its snow removing blade 8 collide against the convex upper wall 5, the convex upper wall 5 becomes sunken due to the flexibility possessed by the annular gasket 7 and the compressibility possessed by the circular elastic member 2. After the snow removing blade 8 passes through the convex upper wall 5, the upper wall 5 is returned back to its projected normal position due to the return force of the gasket 7 and the elastic member 2. In this normal position of the convex upper wall 5, the light reflecting plates 6 can be viewed from the road surface "r". Due to the vertical mobility of the convex upper wall 5, undesired breakage of the same is avoided.

The other is a traffic sign described in Japanese Patent Second Provisional Publication 9-158135. In the sign of this publication, a biasing spring is used for biasing a light reflector upward. That is, when the snow removing vehicle runs on the light reflector, the light reflector is moved down against the biasing force of the spring. Once the vehicle passes through the light reflector, the reflector is moved up to its projected normal position.

However, even the above-mentioned two traffic signs have failed to exhibit satisfied performance due to their inherent constructions. That is, in the former sign, the convex upper wall 5, especially, the slanted wall part 5a of the same tends to loose its transparency due to repeated attacks by snow removing vehicles. If the transparency is severely lowered, the light reflecting plates 6 can not effectively reflect a light. In the latter sign, the biasing spring tends to loose its resiliency due to the repeated compression and expansion movements.

SUMMARY OF THE INVENTION

It is therefore an object of the present invention to provide a traffic sign with a vertically movable light source, which is free of the above-mentioned drawbacks.

According to a first aspect of the present invention, there is provided a traffic sign which comprises a housing having an open upper end; a holder vertically movably received in the housing; a light emitting unit installed in the holder to move therewith; a transparent plate mounted on the holder to move therewith, the transparent plate permitting a light from said light emitting unit to transmit therethrough; a space defined between a bottom of the housing and a lower end of the holder to permit the vertical movement of the holder in the housing; an elastic support ring having an inner wall fixed to an outer surface of the holder and an outer wall fixed to an inner surface of the housing; projections formed on the elastic support ring, each projection being projected upward beyond the transparent plate; and recesses provided by the elastic support ring, each recess being defined between the projections, so that the light from the light emitting unit is viewed through the transparent plate and each of the recesses.

According to a second aspect of the present invention, there is provided a traffic sign for use in a road. The sign comprises a housing adapted to be mounted in the road, the housing being formed with a cylindrical bore; a cylindrical holder vertically movably received in the bore of the housing; a light emitting unit installed in the holder to move therewith; a circular transparent plate mounted on the holder to move therewith, the transparent plate permitting a light from said light emitting unit to transmit therethrough; a cylindrical space defined between a circular bottom of the bore and a circular lower end of the holder to permit the vertical movement of the holder; an elastic support ring having an inner cylindrical wall bonded to an outer cylindrical wall of the holder and an outer cylindrical wall boded an inner cylindrical wall of the bore; projections integrally formed on the elastic support ring, each projection projecting upward beyond the transparent plate; and recesses provided by the elastic support ring, each recess being defined between the projections, so that the light from the light emitting unit is viewed through the transparent plate and each of the recesses.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

Referring to FIGS. 1 to 4 of the drawings, there is shown a traffic sign 100A which is a first embodiment of the present invention. As will become apparent as the description proceeds, the traffic sign of the invention is of a type which has a light source which is vertically movably installed therein.

Figure 1:
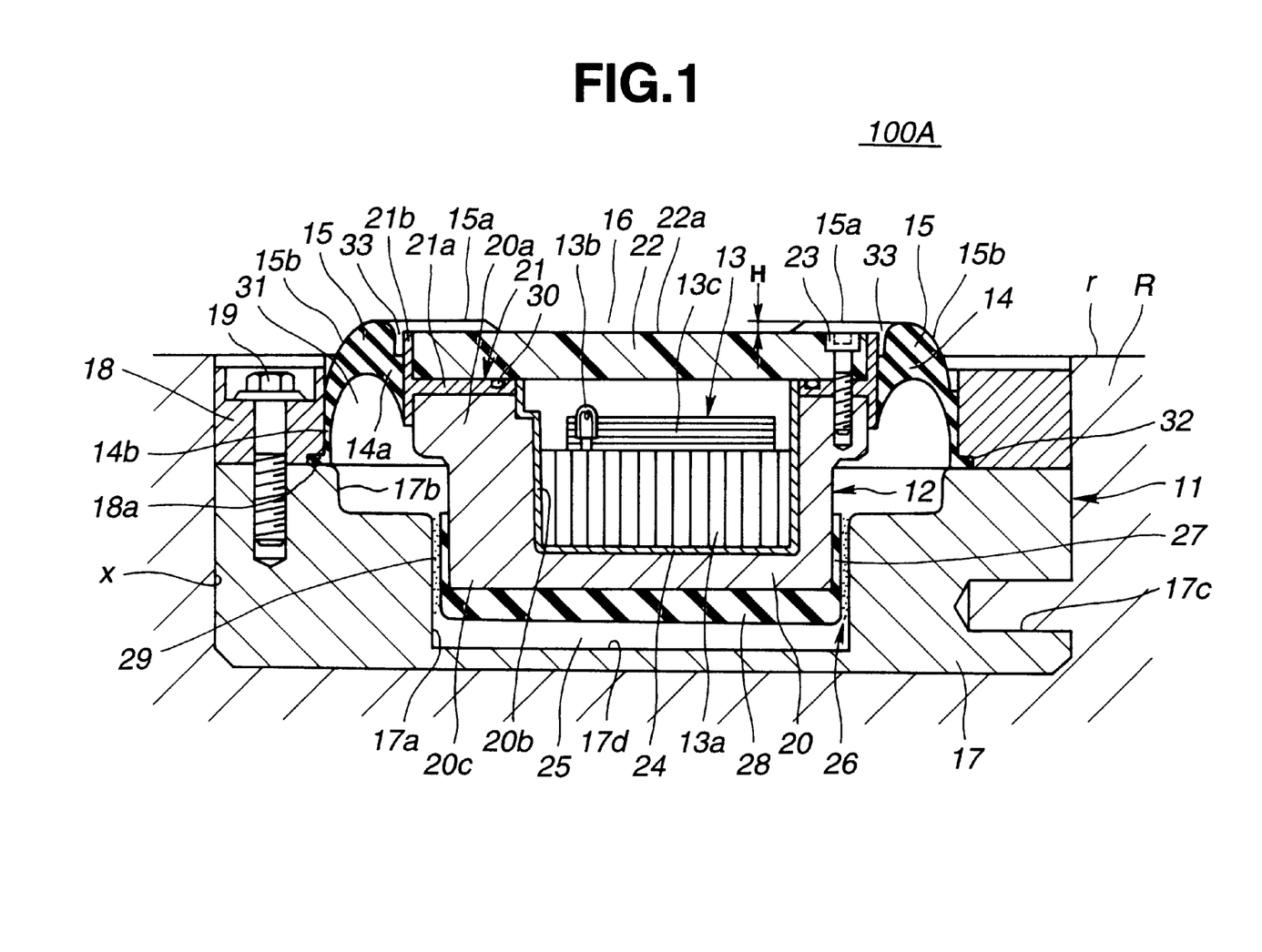
FIG. 1 is a sectional view of a traffic sign which is a first embodiment of the present invention and a view taken along the line "A—A" of FIG. 4.
Figure 4:
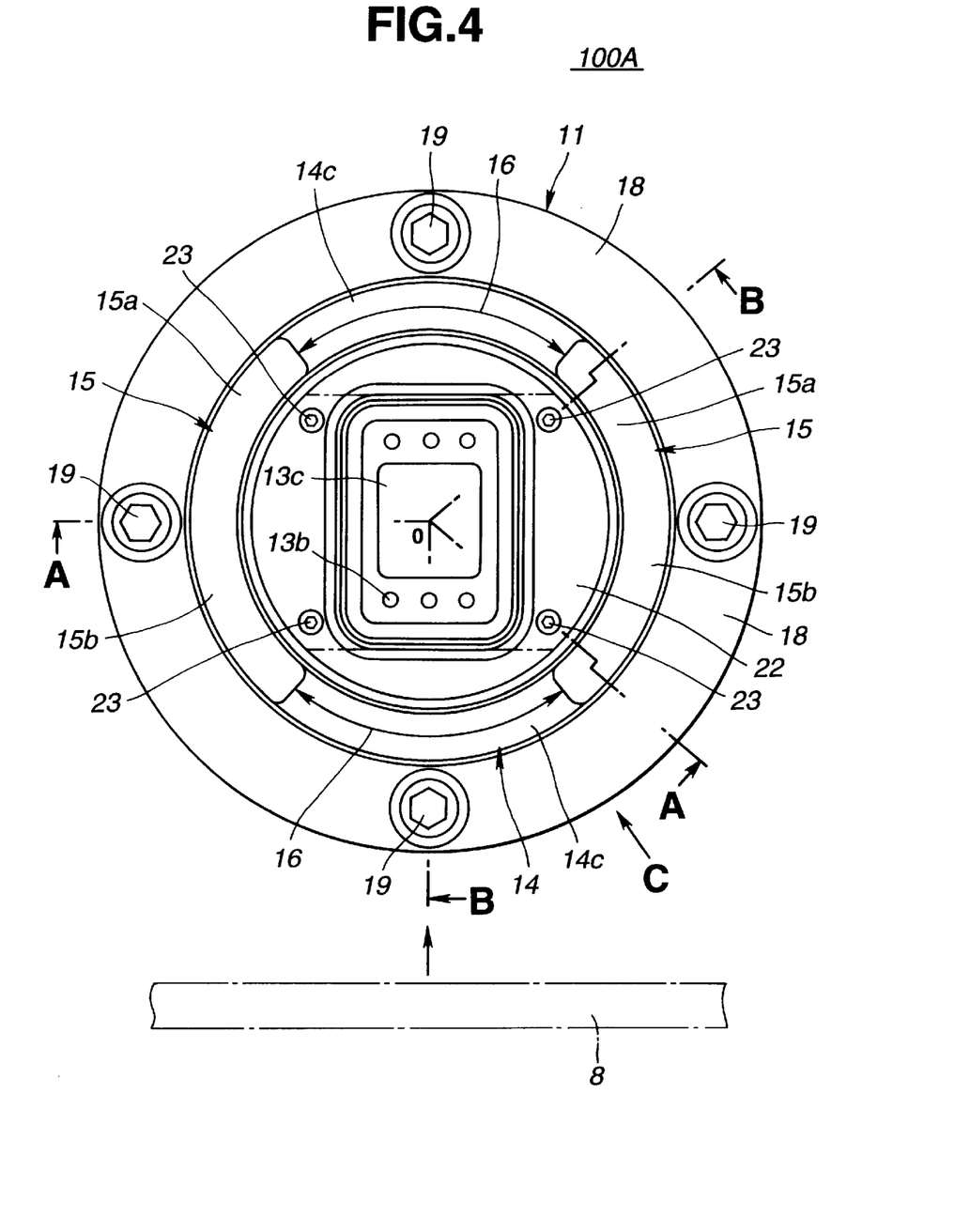
FIG. 4 is a plan view of the traffic sign of the first embodiment.

As is seen from FIG. 1, the traffic sign 100A comprises generally a bottomed cylindrical housing 11 which is laid under a paved road surface "r", a cylindrical holder 12 which is vertically movably received in the housing 11 and has a light emitting unit 13 installed therein, an elastic support ring 14 which is made of rubber material and disposed between the housing 11 and the holder 12 to resiliently support the holder 12 on the housing 11, two arcuate projected portions 15 (see FIG. 4) which are integrally formed on the elastic support ring 14 and two arcuate recesses 16 (see FIG. 4) which are each defined between the arcuate projected portions 15. As shown in FIG. 4, the two arcuate projected portions 15 are provided at diametrically opposed positions of the elastic support ring 14, and the two arcuate recesses 16 are also provided at diametrically opposed positions of the support ring 14.

Referring back to FIG. 1, the housing 11 is constructed of a metal such as aluminum or the like. The housing 11 comprises a circular lower part 17 fitted in a bore "X" provided in the paved road "R", and an annular upper part 18 concentrically mounted on and fixed to the lower part 17 by means of four connecting bolts 19.

The circular lower part 17 is formed with a circular recess which comprises a smaller diameter lower portion 17a and a larger diameter upper portion 17b which are merged. Thus, an annular step (no numeral) is defined between these two portions 17a and 17b, as shown. The circular lower part 17 is formed at its outer surface with diametrically extending bores 17c into which part of the paved road "R" (viz., cement) is inserted for achieving an assured connection of the lower part 17 to the paved road "R".

The annular upper part 18 has an inner diameter somewhat larger than the diameter of the larger diameter upper portion 17b of the lower part 17, and has a small annular groove 18a around an inner lower peripheral wall thereof.

The holder 12 comprises a holder proper 20 constructed of a metal or plastic, an apertured circular seat member 21 disposed on an upper portion 20a of the holder proper 20, and a circular transparent plastic plate 22 mounted on the sheet member 21. For coupling these members 20, 21 and 22 as a unit, four connecting bolts 23 are used in the illustrated manner.

As is seen from FIGS. 1 and 4, the holder proper 20 is formed with a rectangular recess 20b which has a holding case 24 tightly installed therein. Within the holding case 24, there is installed a light emitting unit 13 (see FIG. 4) that comprises a solar battery 13a, a plurality of lamps 13b and a light collecting portion 13c.

Returning back to FIG. 1, between a lower end 20c of the holder proper 20 and a bottom wall 17d of the smaller diameter lower recess 17a, there is defined a cylindrical space 25 which permits upward and downward movement of the holder 12. The outer diameter of the lower end portion 20c of the holder proper 20 is somewhat smaller than the diameter of the smaller diameter lower recess 17a, so that there is defined between the outer cylindrical wall of the lower end portion 20c and the inner cylindrical wall of the lower recess 17a a thin cylindrical space 26 which can guides the upward and downward movement of the holder 12. A rubber cap (27+28) consisting of a cylindrical part 27 and a thicker circular part 28 is concentrically put on the lower end portion 20c of the holder proper 20. That is, as shown, the cylindrical part 27 is intimately put on the outer cylindrical wall of the lower end portion 20c and the circular part 28 is intimately put on the circular lower end of the holder proper 20. The two parts 27 and 28 are bonded through vulcanization. Due to provision of this rubber cap, collision of the holder proper 20 against the inner cylindrical wall of the smaller diameter lower recess 17a and that against the bottom wall 17d of the lower recess 17a are damped.

Around the cylindrical part 27 of the rubber cap, there is applied a grease 29 for smoothing the upward and downward movement of the holder 12 in the housing 11. If desired, in place of the grease 29, a sheet of fluoroethylene resin may be applied to the part 27.

The apertured circular seat member 21 is constructed of a metal. As shown, the seat member 21 has a radially outer portion with a generally T-shaped cross section and comprises a horizontal flat part 21a which is sandwiched between the holder proper 20 and the transparent plastic plate 22 and an annular vertical flange part 21b which is integrally formed on an outer periphery of the flat part 21a to hold the outer periphery of the upper portion 20a of the holder proper 20 and that of the transparent plastic plate 22. The horizontal flat part 21a of the seat member 21 is formed on its upper surface with an annular groove for receiving therein a seal member 30. With this seal member 30, a hermetical sealing between the horizontal flat part 21a and the transparent plastic plate 22 is achieved. That is, the interior of the holding case 24 is hermetically isolated.

Figure 2:
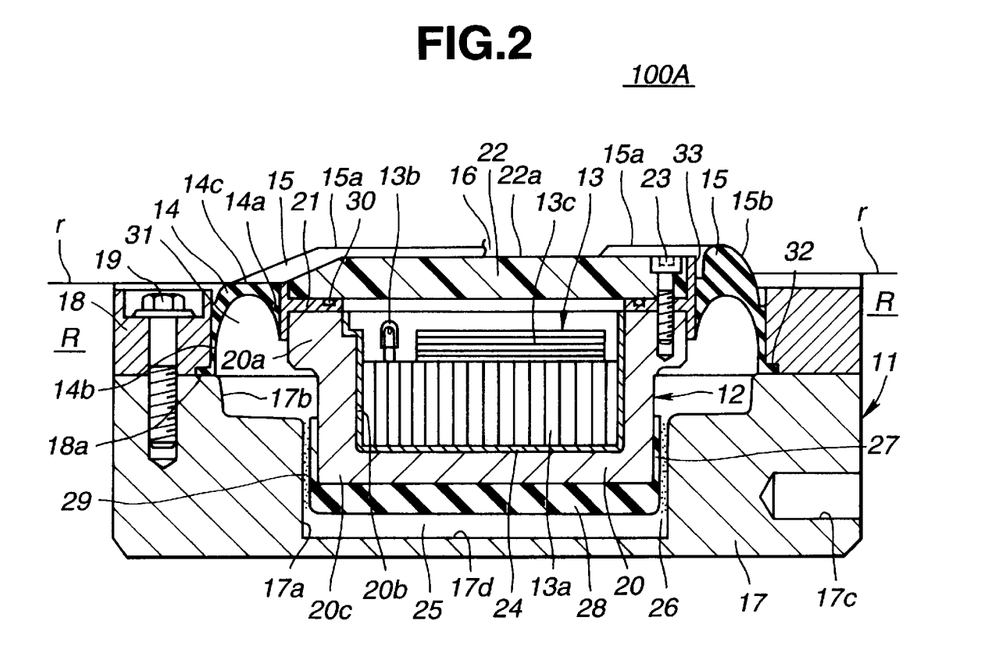
FIG. 2 is a sectional view of the first embodiment, taken along the line "B—B" of FIG. 4.

As is seen from FIGS. 1 and 2, the elastic support ring 14 is concentrically interposed between the annular upper part 18 of the housing 11 and the annular vertical flange part 21b of the seat member 21. As is seen from these drawings, upon assembly, the support ring 14 has a reversed U-shaped cross section leaving a concave recess 31 on a lower side thereof. The elastic support ring 14 has an inner peripheral portion 14a bonded via vulcanization to the annular vertical flange part 21b and an outer peripheral portion 14b bonded via vulcanization to the annular upper part 18. An upper flat portion 14c of the support ring 14 is shaped and arranged to be lower than an upper flat surface 22a of the transparent plastic plate 22. The upper flat portion 14c defines a bottom of the arcuate recess 16. The outer peripheral portion 14b of the support ring 14 has a lower flange 32 pressed in the annular groove 18a of the annular upper part 18 of the housing 11. With the lower flange 32, hermetic sealing between the lower and upper parts 17 and 18 of the housing 11 is assured.

Figure 3:
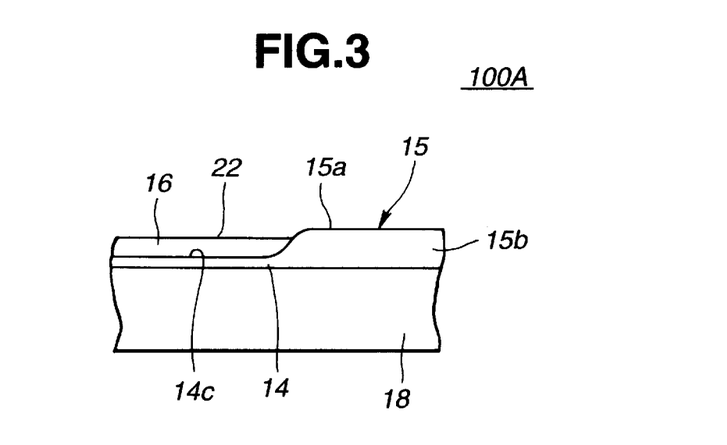
FIG. 3 is a partial view taken from the direction of the arrow "C" of FIG. 4.

As is seen from FIGS. 1, 3 and 4, the two arcuate projected portions 15 are integrally formed on diametrically opposed portions of upper flat portion 14c, and each of the two arcuate recesses 16 is positioned between the projected portions 15. As is seen from FIGS. 1 and 2, each projected portion 15 has a top 15a higher than the upper flat surface 22a of the transparent plastic plate 22 and has a tapered outer surface 15b whose height gradually increases with reduction in distance to a center of the support ring 14. Between each projected portion 15 and the annular vertical flange part 21b of the seat member 21, there is defined an arcuate groove 33.

It is to be noted that upon installation in the paved road "R", the traffic sign 100A is so oriented that an imaginary axis passing through respective middles of the two arcuate recesses 16 extends along the longitudinal direction of the paved road "R". With this, as is understood from FIGS. 2 and 3, an upper part of the transparent plastic plate 22 can be viewed from the longitudinal direction of the road "R" through each of the arcuate recesses 16.

In the following, operation will be described.

For ease of understanding, the description will be commenced with respect to a normal condition of the traffic sign 100A. As shown in FIGS. 1 and 2, in this normal condition, the holder 12 in the housing 11 assumes its uppermost position projecting the projected portions 15 of the elastic support ring 14 and the transparent plastic plate 22 upward beyond the road surface "r". Thus, the upper part of the transparent plate 22 is viewed from the longitudinal directions of the road "R" through the arcuate recesses 16 of the support ring 14. That is, the light produced by the light emitting unit 13 and emitted from the transparent plastic plate 22 can be viewed by a driver on a motor vehicle running on the road surface "r".

Figure 5:
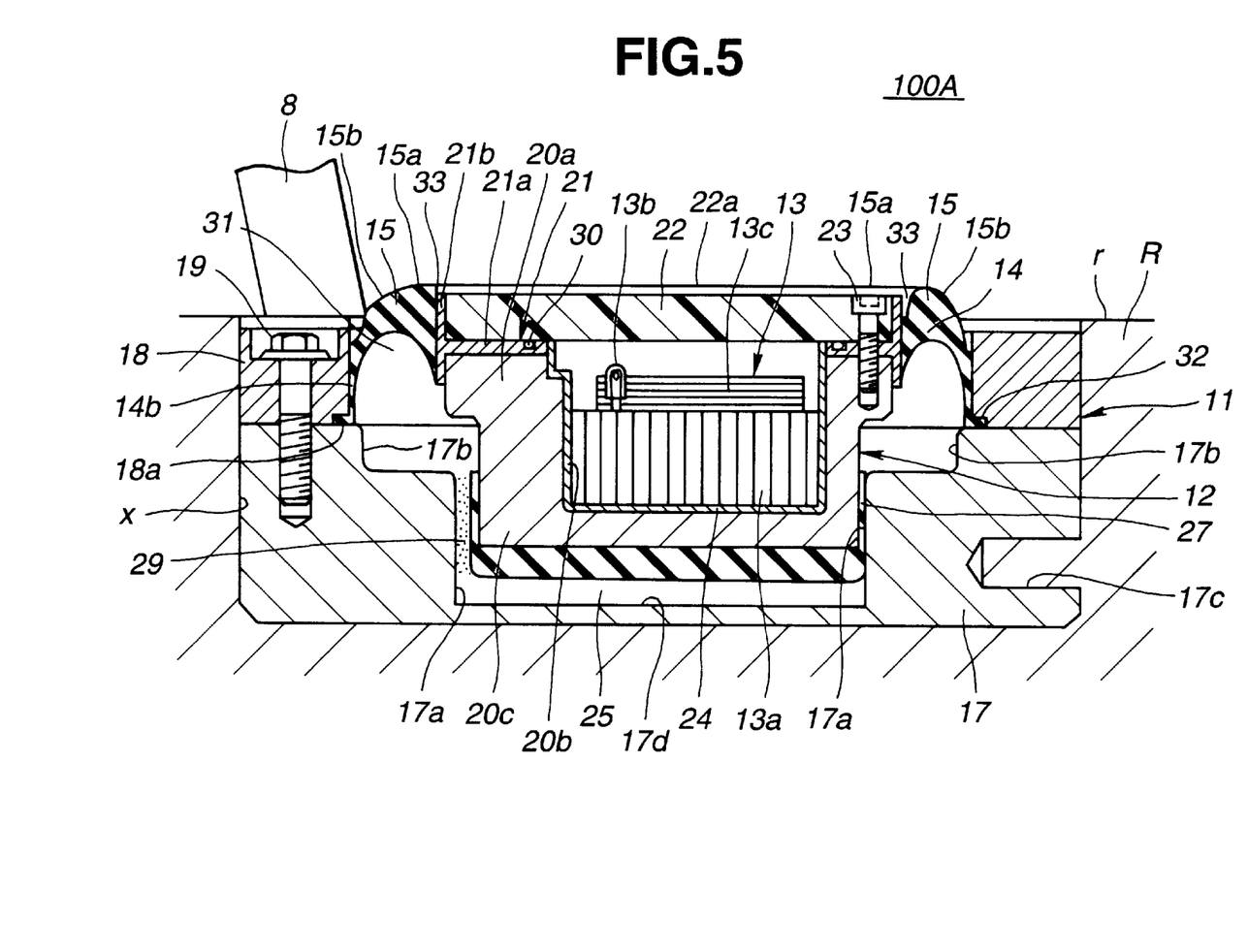
FIGS. 5, 6 and 7 are views similar to FIG. 1, but showing different operation conditions of the first embodiment.

When now, as is seen from FIG. 4, a snow removing blade 8 of a snow removing vehicle slides on the road surface "r" and comes into collision with the tapered outer surface 15b of the projected portions 15 as shown in FIG. 5, the projected portions 15 are deformed into the arcuate grooves 33 while shifting the holder 12 slightly forward, that is, rightward in FIG. 5. This slight forward shifting of the holder 12 is permitted by the provision of the thin cylindrical space 26 provided between the outer surface of the holder 12 and the inner surface of the lower recess 17a of the housing 11.

Figure 6:
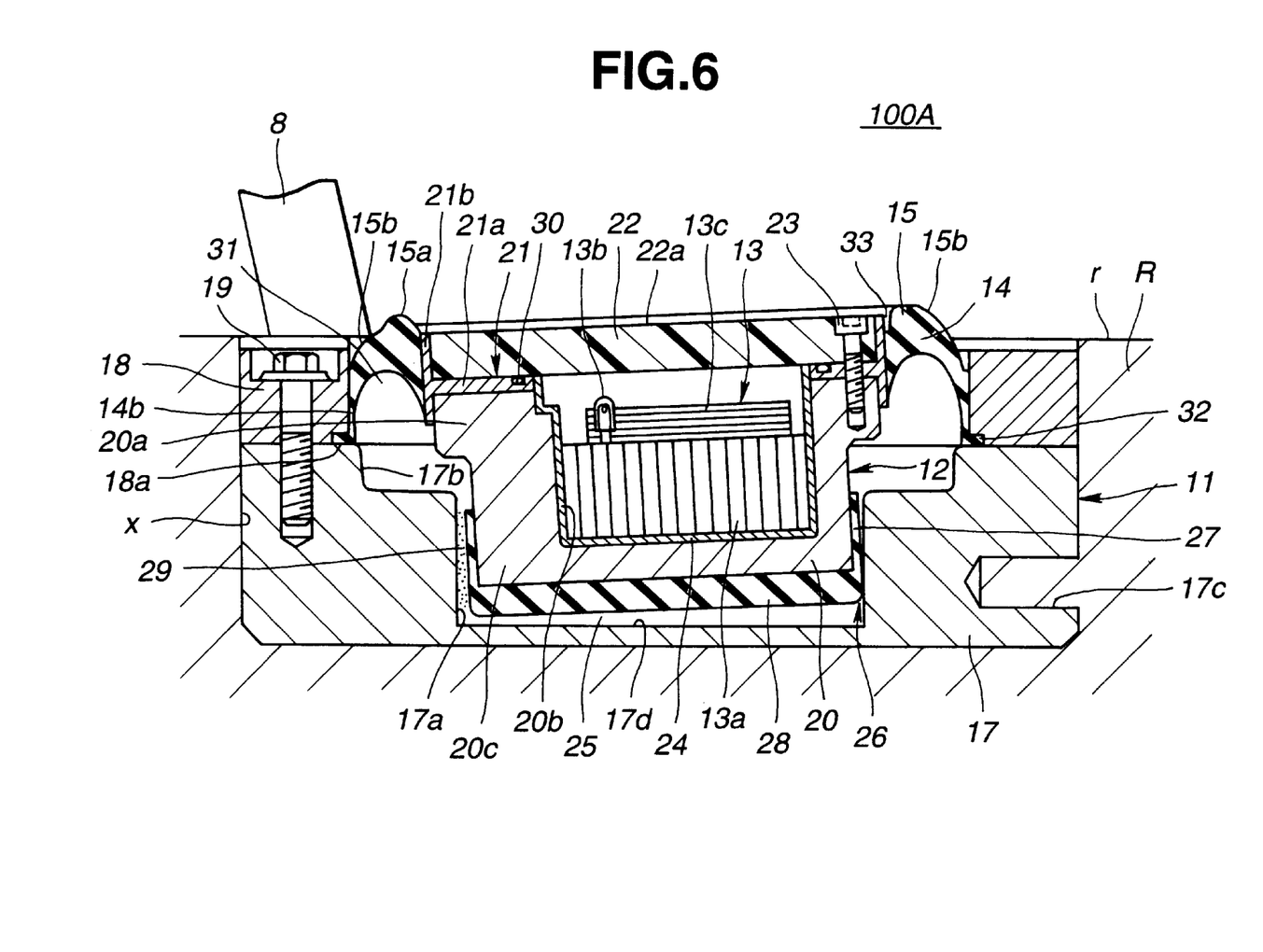

When then as is seen from FIG. 6, the snow removing blade 8 rides on the tapered outer surface 15b of the projected portions 15, the holder 12 is inclined but slightly relative to the housing 11 while sliding downward using the inner cylindrical surface of the smaller diameter lower portion 17a as a guide.

Figure 7:
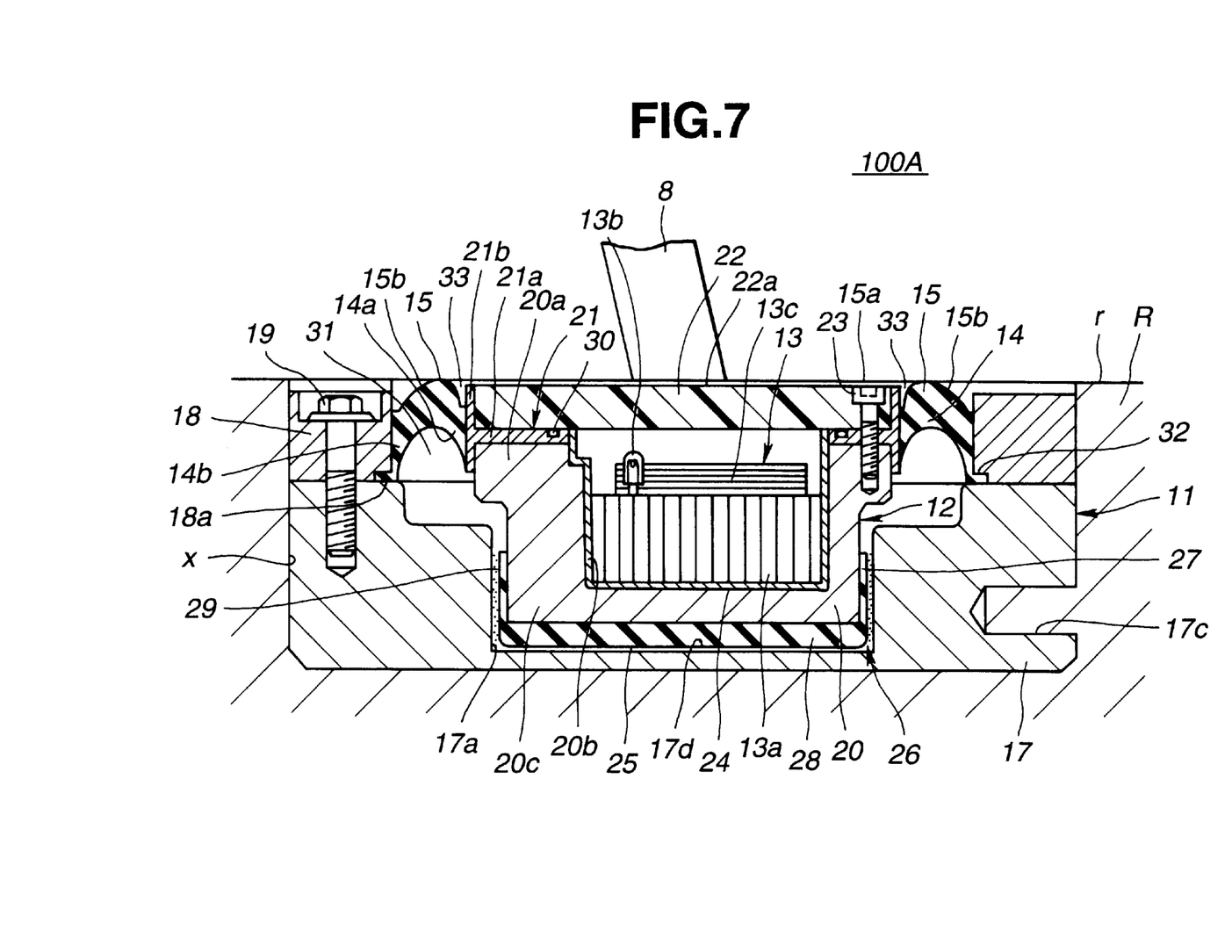

When then, as is seen from FIG. 7, the snow removing blade 8 completely rides on the tops 15a of the projected portions 15, the entire of the holder 12 is lowered against a biasing force of the elastic supporting ring 14 and fully received in the housing 11. Due to provision of the projected portions 15, the upper flat surface 22a of the transparent plastic plate 22 is prevented from contacting the blade 8.

When the snow removing blade 8 passes through the projected portions 15, the entire of the holder 12 is lifted up to its uppermost normal position by the force of the elastic supporting ring 14.

It is now to be noted that during the above-mentioned downward and upward movements of the holder 12, a chamber including the concave recess 31 (see FIG. 1), the lower and upper portions 17a and 17b and the think cylindrical space 26 can act as an air cushion, which smoothes and dampens the movements.

As is described hereinabove, when the snow removing blade 8 collides against and rides on the projected portions 15, the entire of the holder 12 is moved down and fully put in the housing 11 preventing the transparent plastic plate 22 from being damaged by the blade 8. Due to provision of the annular grooves 33 (see FIGS. 1 and 5), the elastic deformation of the projected portions 15 is smoothly carried out, which avoids application of excessive load to the entire structure of the elastic support ring 14 and thus allows the ring 14 to have a longer life. Due to the elasticity possessed by the ring 14, the shock applied to the ring 14 by the blade 8 is dampened thereby smoothly starting the downward movement of the holder 12. Due to provision of the thicker circular part 28 made of rubber material, a shock produced when, under downward movement, the holder 12 collides against a bottom wall 17d of the recess of the circular lower part 17 is appropriately dampened. Furthermore, because the elastic support ring 14 is bonded via vulcanization to both the annular upper part 18 of the housing 11 and the circular seat member 21, the work for assembling the traffic sign 100A is facilitated. Furthermore, due to such bonding, the sealing to the air cushion chamber (viz., the chamber including the portions 31, 17b, 17a and 26) is improved.

Figure 8:
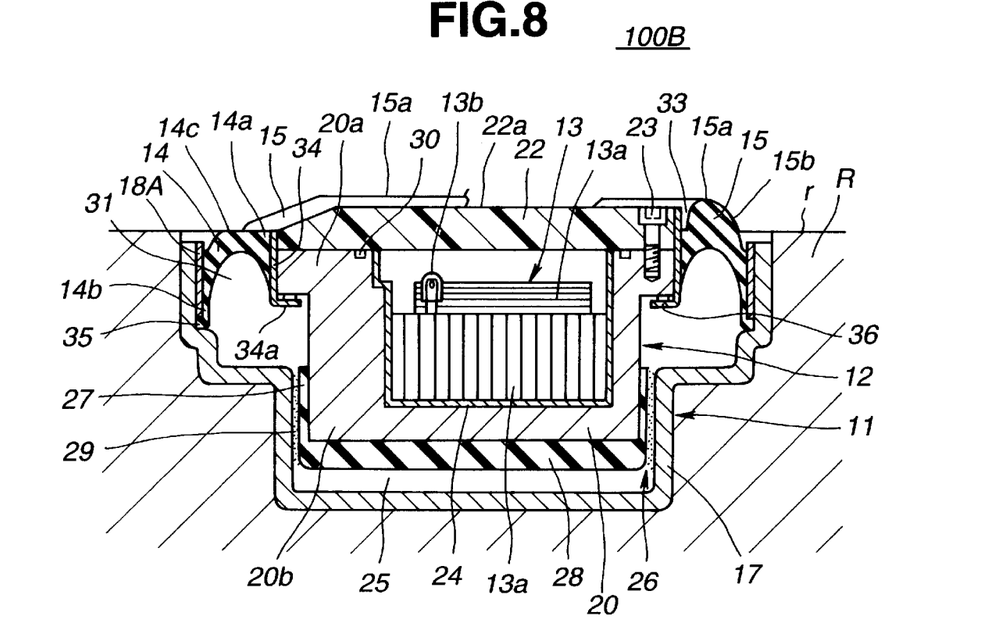
FIG. 8 is a sectional view of a traffic sign which is a second embodiment of the present invention.

Referring to FIG. 8, there is shown a traffic sign 100B which is a second embodiment of the present invention.

Since this second embodiment 100B is similar to the above-mentioned first embodiment 100A, only parts and construction which are different from those of the first embodiment will be described in detail in the following.

As shown, in this second embodiment 100B, a single unit housing 11 is used, which has the holder 12 vertically movably held therein. An annular seat member 34 is used as a substitute for the apertured circular seat member 21. As shown, the annular seat member 34 holds the outer periphery of the upper portion 20a of the holder proper 20 and that of the transparent plastic plate 22. The annular seat member 34 has an inwardly bent lower flange 34a to press a seal ring 36 against the upper portion 20a of the holder proper 20. Another annular seat member 18A is used, which is disposed within an upper part of the single unit housing 11. To these two seat members 34 and 18A, the elastic support ring 14 are bonded via vulcanization, like in case of the above-mentioned first embodiment.

Figure 9:
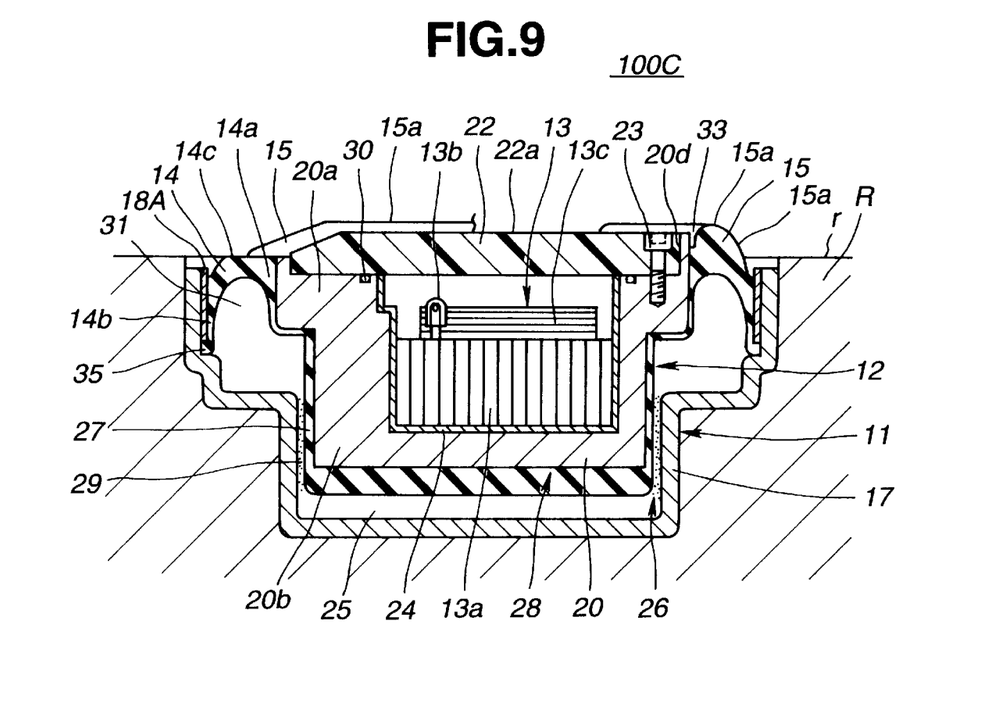
FIG. 9 is a sectional view of a traffic sign which is a third embodiment of the present invention.

Referring to FIG. 9, there is shown a traffic sign 100C which is a third embodiment of the present invention.

Since this third embodiment 100C is similar to the above-mentioned second embodiment 100B, only parts and construction which are different from those of the second embodiment will be described in detail in the following.

As shown, in this third embodiment 100C, the upper portion 20a of the holder proper 20 is formed with a circular recess 20d in which the transparent plastic plate 22 is put. Furthermore, the elastic supporting ring 14 and the rubber cap (27+28) are integral with each other, and there is no means corresponding to the annular seat member 34 employed in the second embodiment 100B. In this third embodiment 100C, the integral structure is bonded to the outer surface of the holder proper 20 via vulcanization.

Figure 10:
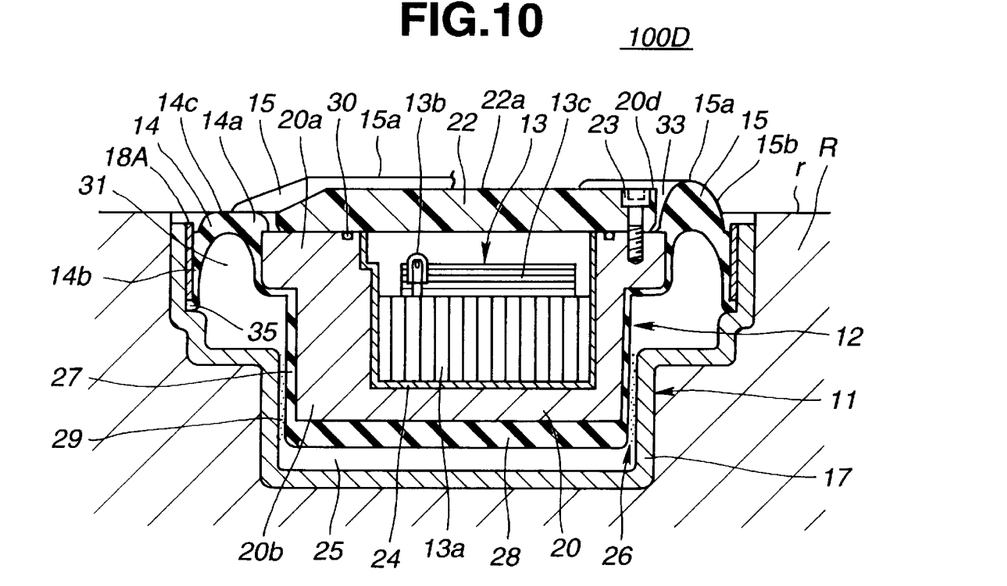
FIG. 10 is a sectional view of a traffic sign which is a fourth embodiment of the present invention.

Referring to FIG. 10, there is shown a traffic sign 100D which is a fourth embodiment of the present invention.

Since this fourth embodiment 100D is similar to the above-mentioned third embodiment 100C, only parts and construction which are different from those of the third embodiment will be described in detail in the following.

As shown, in this fourth embodiment 100D, there is no means corresponding to the circular recess 20d employed in the third embodiment 100C, and the arcuate groove 33 defined between each projected portion 15 of the elastic support ring 14 and the periphery of the transparent plastic plate 22 is formed large as compared with that in the third embodiment.

Figure 11:
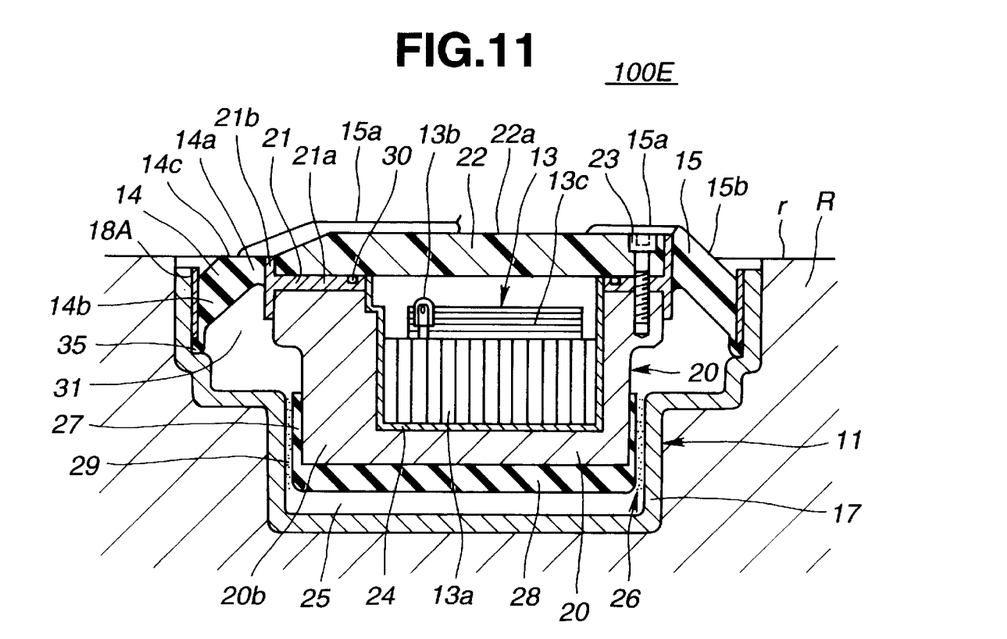
FIG. 11 is a sectional view of a traffic sign which is a sixth embodiment of the present invention.

Referring to FIG. 11, there is shown a traffic sign 100E which is a fifth embodiment of the-present invention.

Since this fifth embodiment 100E is similar to the above-mentioned first embodiment 100A, only parts and construction which are different form those of the first embodiment will be described in detail in the following.

As shown, in this fifth embodiment 100E, a conical elastic support ring 14 is employed, which has an inner cylindrical wall bonded to the annular vertical flange part 21b of seat member 21 and an outer cylindrical wall bonded to the annular seat member 18A. Furthermore, in this fifth embodiment 100E, each arcuate projected portion 15 has a peaked top.

The entire contents of Japanese Patent Application P10-228853 (filed Aug. 13, 1998) are incorporated herein by reference.

Although the invention has been described above with reference to certain embodiments of the invention, the invention is not limited to the embodiments described above. Various modifications and variations of the embodiments described above will occur to those skilled in the art, in light of the above teachings.

What is claimed is:

1. A traffic sign comprising:
a housing having an open upper end;
a holder vertically movably received in said housing;
a light emitting unit installed in said holder to move therewith;
a transparent plate mounted on said holder to move therewith, said transparent plate permitting a light from said light emitting unit to transmit therethrough;
a space defined between a bottom of said housing and a lower end of said holder to permit the vertical movement of said holder in said housing;
an elastic support ring having an inner wall fixed to an outer surface of said holder and an outer wall fixed to an inner surface of said housing;
projections formed on said elastic support ring, each projection projecting upward beyond said transparent plate; and
recesses provided by said elastic support ring, each recess being defined between said projections, so that the light from said light emitting unit is viewed through said transparent plate and each of said recesses.

2. A traffic sign as claimed in claim 1, in which each of said projections is integral with said elastic support ring.

3. A traffic sign as claimed in claim 1, in which said elastic support ring has a reversed U-shaped cross section with a concave recess provided at a lower side thereof.

4. A traffic sign as claimed in claim 1, in which said elastic support ring is formed with an arcuate groove between the inner cylindrical wall of said ring and the outer surface of said holder.

5. A traffic sign as claimed in claim 1, in which a cylindrical thin space is defined between the inner surface of said housing and the outer surface of said holder to permit the vertical movement of said holder in said housing.

6. A traffic sign as claimed in claim 5, in which the outer surface of said holder is equipped with a shock absorbing member to dampen a shock produced when said holder collides against the inner surface of said housing.

7. A traffic sign as claimed in claim 5, in which said shock absorbing member is integral with said elastic support ring.

8. A traffic sign as claimed in claim 5, in which said cylindrical thin space is applied with a lubrication material.

9. A traffic sign as claimed in claim 1, in which the lower end of said holder is equipped with a shock absorbing member for dampening a shock produced when said lower end of said holder collides against the bottom of said housing.

10. A traffic sign as claimed in claim 1, in which said housing comprises:
a circular lower part formed with a circular recess;
an annular upper part concentrically mounted on said lower part; and
bolts each passing through said upper and lower parts to couple the parts.

11. A traffic sign as claimed in claim 10, in which the outer cylindrical wall of said elastic support ring is bonded to an inner cylindrical wall of said annular upper part.

12. A traffic sign as claimed in claim 11, in which the outer cylindrical wall of said elastic support ring is formed with a flange which is pressed between said lower and upper parts of said housing.

13. A traffic sign as claimed in claim 1, in which a chamber defined by an inner surface of said housing, an outer surface of said holder and a lower surface of said elastic support ring constitutes a hermetically sealed container.

14. A traffic sign for use in a road, comprising:
a housing adapted to be mounted in said road, said housing being formed with a cylindrical bore;
a cylindrical holder vertically movably received in the bore of said housing;
a light emitting unit installed in said holder to move therewith;
a circular transparent plate mounted on said holder to move therewith, said transparent plate permitting a light from said light emitting unit to transmit therethrough;
a cylindrical space defined between a circular bottom of said bore and a circular lower end of said holder to permit the vertical movement of said holder;
an elastic support ring having an inner cylindrical wall bonded to an outer cylindrical wail of said holder and an outer cylindrical wall boded an inner cylindrical wall of said bore;
projections integrally formed on said elastic support ring, each projection projecting upward beyond said transparent plate; and
recesses provided by said elastic support ring, each recess being defined between the projections, so that the light from said light emitting unit is viewed through said transparent plate and each of said recesses.

15. A traffic sign as claimed in claim 14, further comprising an elastic cap which is put on a lower portion of said holder to dampen a shock produced when said holder collides against the inner surface of the bore of said housing.

16. A traffic sign as claimed in claim 15, in which said elastic cap and said elastic support ring are integral with each other.

17. A traffic sign as claimed in claim 16, further comprising a lubrication material applied to the inner cylindrical surface of the bore of said housing to smooth the vertical movement of said holder.

18. A traffic sign as claimed in claim 14, in which said the inner surface of said housing, the outer surface of said holder and a lower surface of said elastic support ring constitutes a hermetically sealed chamber.

19. A traffic sign as claimed in claim 1, in which said housing is formed at its outer surface with diametrically extending bores.

* * * * *